May 16, 1950     G. F. SCHROEDER     2,507,936
POWER CONTROL DEVICE
Filed March 12, 1949
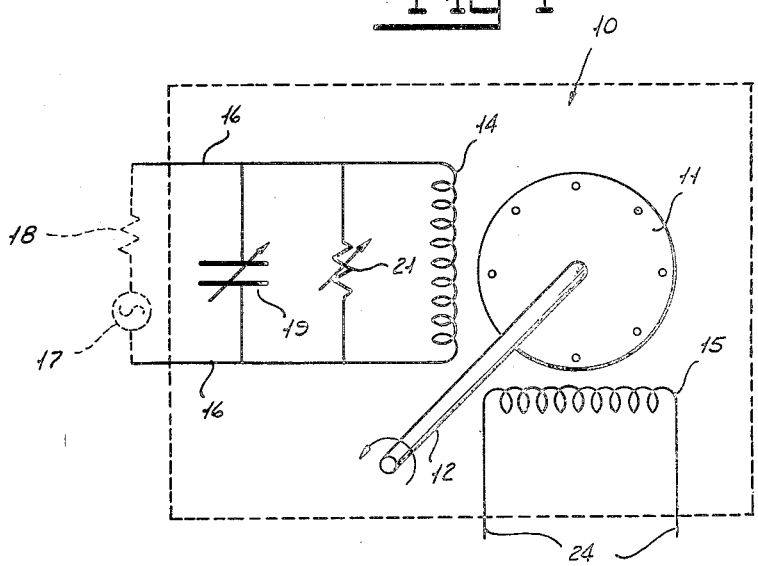
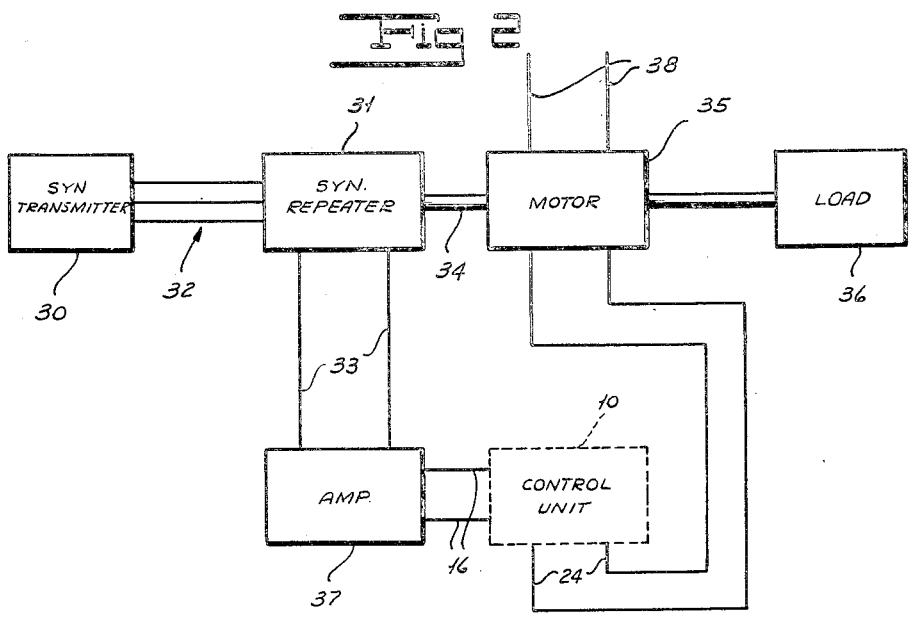
INVENTOR.
GEORGE F. SCHROEDER
BY Victor D. Borst
ATTORNEY Patented May 16, 1950

2,507,936

UNITED STATES PATENT OFFICE 2,507,936

POWER CONTROL DEVICE

George Francis Schroeder, Rosedale, N. Y., assignor to The Sperry Corporation, Long Island City, N. Y., a corporation of Delaware Application March 12, 1949, Serial No. 81,188

6 Claims. (Cl. 318—30)

This invention relates to a power control device and more particularly to a device responsive to a low power A. C. input to control a high power A. C. output.

An object of the invention is to provide a device of the above type which is responsive to extremely small power inputs such as the output of a vacuum tube amplifier and which operates without drawing power from its input circuit, and is capable of controlling a large output such as several horsepower without reaction on its input circuit.

Another object is to provide a mechanically driven device of the above type in which the output power is derived from the mechanical input but is controlled as to frequency, phase and voltage by a low power A. C. input, whereby the output frequency is independent of variations in speed of the mechanical input.

Another object is to provide a device of the above type which is rapid in its response to variations in the input voltage.

A more specific object is to provide a device of the above type for use in servo mechanisms wherein a heavy load such as a gun mount is to be controlled.

Various other objects and advantages will be apparent as the nature of the invention is more fully disclosed.

The present invention is based on the principle that a two phase generator having quadrature windings and driven by a prime mover may be connected to supply output power from one winding which is controlled in response to a voltage supplied to the other winding. In accordance with this invention the control winding forms a part of a resonant circuit in which self-sustained oscillations are prevented by a small load and the generator is driven at a speed such that the induced voltage supplies the losses in the resonant circuit. Hence no power or a minimum amount of power is required for the excitation although the output remains fully under the control of the excitation voltage and directly proportional thereto throughout the useful range of the device.

The novel features of the invention will be better understood by referring to the following description, taken in connection with the accompanying drawing in which a specific embodiment has been shown for purposes of illustration.

In the drawings:

Fig. 1 is a schematic diagram of a circuit illustrating one embodiment of control unit; and Fig. 2 is a schematic diagram illustrating the use of the unit of Fig. 1 in a servo follow-up mechanism.

Referring to Fig. 1, the unit is shown as comprising a generator 10 having an armature 11 which may be of the squirrel cage or of the wound type and is driven by a shaft 12 which is coupled to any prime mover (not shown) such as an electric motor capable of supplying the necessary power for an internal combustion engine.

The generator 10 is provided with a pair of quadrature field windings 14 and 15 which are shown as separate windings but may constitute parts of a wound stator as is well known in the art. For present purposes the winding 14 is considered as the exciting winding and the winding 15 as the output or power winding.

The exciting winding 14 is supplied with an exciting voltage by a suitable input line 16 from a source indicated as a generator 17 in series with a resistor 18. The generator may constitute the output of a vacuum tube amplifier or other low power A. C. source and the resistor 18 represents the internal impedance of the source 17.

The exciting winding 14 is tuned to resonance at the intended speed of drive of the armature 11 by a condenser 19 and power is withdrawn by a load indicated by a variable resistor 21 which is adjusted to extract sufficient power to prevent free oscillations from developing in the tuned circuit. If the impedance of the source 17 is sufficient for this purpose the resistor 21 may be omitted.

The power winding 15 is connected to supply output power to the line 24.

In the operation of this unit the control winding 14 is used to produce a flux which enables the rotor 11 to generate power in the output winding 15. Since the rotor conductors are moving in a magnetic field they will have a voltage induced in them that is proportional to the speed of the rotor and magnitude of the flux. If the speed is constant, the voltage will vary with the field and thus be a function of the control field voltage. This velocity voltage in the rotor will then in turn produce an alternating quadrature field. It is then possible to couple power out of this field with a winding placed in quadrature with the control winding. With this winding arrangement the load currents will not directly couple into the control winding. There will also be transformer voltages and another velocity voltage present in the rotor. However, if the output winding is open and the rotor is driven to a speed where it develops a countertorque the mechanical energy input to the rotor will supply the mechanical and the electrical losses as well. A speed may be found where the input to the rotor shaft will supply all the control winding losses. Speeds in excess of this will result in power being forced out of the control winding against the control voltage. It is evident that the control winding will then appear as an inductance with a negative resistance. By placing a condenser in parallel with the control winding the inductive currents are tuned out but this would result in a self-maintaining resonant circuit. To prevent this a power consuming element such as a resistor, vacuum tube or the output impedance of the control voltage source is introduced in series or parallel with the control winding. The effective resistance of the control circuit may then be adjusted to the desired impedance level. This adjustment will also regulate the band-width of the circuit as is characteristic of any tuned circuit.

With the system operating in this way and all losses supplied by the mechanical input the input voltage on the line 16 controls the voltage of the exciter winding 14 but supplies substantially no power thereto. However, any variations in voltage on the exciter winding produces a corresponding change in voltage in the power winding 15, in amplitude, frequency and phase. If the frequency of the control voltage is constant the output voltage follows the variations in input voltage as to frequency and phase and the control is rapid as it does not rely upon any change in permeability of a core.

Therefore, the output voltage may be controlled with a low power voltage source and the output power will be supplied by the driving motor. The output power will be limited by the allowable heat rise of the unit.

Referring to Fig. 2 the unit is shown as connected to control a heavy load such as a gun mount in response to a small input. This figure shows a synchronous transmitter 30 and a synchronous repeater 31 of any well known type connected by a three phase line 32 and so arranged that a voltage is produced in an output line 33 which is proportional to the mechanical displacement between the rotors of the transmitter and the repeater and of a phase depending upon the direction of this displacement. The rotor of the repeater 31 is connected to be driven by the shaft 34 of a large motor 35 which also drives a load 36 which may constitute a gun mount.

The line 33 is connected to the input of a suitable amplifier 37 having an output connected to the line 16 which constitutes the input to the control unit of Fig. 1. The output line 24 of this unit is connected to control the motor 35 which is supplied by a power line 38.

In this embodiment the motor 35 which may develop several horsepower is accurately controlled by an input to the control unit of only a few watts.

The control system is applicable to various uses wherein a high power A. C. load is to be controlled by a low power A. C. input and a specific use has been shown for purposes of illustration only.

What is claimed is:

1. An alternating current control system wherein a low power A. C. input is utilized to control a high power A. C. output, comprising a generator having a driven rotor and a pair of field windings in non-inductive relationship to each other, circuits supplying an exciting voltage to one of said windings, means tuning said last winding to resonance, a load connected to prevent free oscillations in the tuned circuit, and an output circuit supplied from said second winding.

2. In a system according to claim 1 means adjusting said load and the rate of said rotor to cause the rotor to supply the mechanical and electrical losses in the first winding whereby the power drawn from the exciting circuits is reduced to a negligible value.

3. An alternating current control system wherein a low power A. C. input is utilized to control a high power A. C. output, comprising a generator having a driven rotor and a pair of field windings in non-inductive relationship to each other, circuits supplying an exciting voltage to one of said windings, a condenser connected across said last winding to tune the same to resonance, a resistor connected across said last winding to prevent free oscillations therein, and an output circuit connected to said second winding, said rates being driven at a speed to supply the electrical losses in said first winding whereby the voltage in said output circuit varies directly with the exciting voltage but substantially no power is drawn from said source of exciting voltage.

4. A system according to claim 3 in which said windings have a quadrature relationship.

5. The method of control which comprises producing an exciting flux, moving a conductor in said flux to induce a current therein, causing said current to develop a voltage in an induced winding and in an exciting winding, tuning said exciting winding to resonance, introducing a load to extract energy from said exciting winding for preventing free oscillations in the tuned circuit, and applying a variable control voltage to said exciting winding suited to control said flux without drawing power from said control voltage.

6. In a servo system having a synchronous repeater of a type adapted to develop a voltage which is a function of position, a motor connected to drive said repeater, a control unit comprising a driven rotor, an exciting winding, and an output winding, means supplying said voltage to said exciting winding, means tuning said exciting winding to resonance and preventng oscillation thereof and means connecting said output winding to control said motor, said rotor being driven at a speed to supply the electrical losses in said exciting winding and thereby reduce the power drawn thereby from said repeater.

GEORGE FRANCIS SCHROEDER.

No references cited.